(12) United States Patent
Seth et al.

(10) Patent No.: US 11,061,677 B1
(45) Date of Patent: Jul. 13, 2021

(54) RECOVERING REGISTER MAPPING STATE OF A FLUSHED INSTRUCTION EMPLOYING A SNAPSHOT OF ANOTHER REGISTER MAPPING STATE AND TRAVERSING REORDER BUFFER (ROB) ENTRIES IN A PROCESSOR

(71) Applicant: Microsoft Technology Licensing, LLC, Redmond, WA (US)

(72) Inventors: Kiran Ravi Seth, Morrisville, NC (US); Yusuf Cagatay Tekmen, Raleigh, NC (US); Rodney Wayne Smith, Raleigh, NC (US); Shivam Priyadarshi, Morrisville, NC (US); Vignyan Reddy Kothinti Naresh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/887,827

(22) Filed: May 29, 2020

(51) Int. Cl.
*G06F 9/30* (2018.01)
*G06F 11/14* (2006.01)
(Continued)

(52) U.S. Cl.
CPC .......... *G06F 9/30101* (2013.01); *G06F 8/441* (2013.01); *G06F 9/30047* (2013.01);
(Continued)

(58) Field of Classification Search
None
See application file for complete search history.

(56) References Cited

U.S. PATENT DOCUMENTS 5,546,554 A  8/1996 Yung et al.
5,721,857 A  2/1998 Glew et al.
(Continued)

FOREIGN PATENT DOCUMENTS

WO  9625705 A1  8/1996

OTHER PUBLICATIONS

"Notice of Allowance Issued in U.S. Appl. No. 16/562,591", dated Aug. 31, 2020, 16 Pages.
(Continued)

*Primary Examiner* — Corey S Faherty
(74) *Attorney, Agent, or Firm* — Withrow & Terranova, PLLC

(57) ABSTRACT

A register mapping circuit for recovering a register mapping state associated with a flushed instruction by traversing ROB entries from a snapshot of another register mapping state. The register mapping circuit includes a ROB control circuit, a snapshot circuit, and a register rename recovery circuit (RRRC). The ROB control circuit allocates ROB entries to instructions entering a processor pipeline, including a target ROB entry allocated to a target instruction and other ROB entries allocated to other instructions. The snapshot circuit captures snapshots of logical register-to-physical register mapping states in the rename map table in association with a subset of instructions that could be flushed. If the target instruction is flushed, the RRRC restores the rename map table register mapping state corresponding to the target instruction based on a snapshot in a ROB entry allocated to another instruction, and traverses register mapping updates in the intervening ROB entries.

40 Claims, 8 Drawing Sheets

(51) Int. Cl.
*G06F 8/41* (2018.01)
*G06F 9/38* (2018.01)

(52) U.S. Cl.
CPC ........ *G06F 9/30079* (2013.01); *G06F 9/3855* (2013.01); *G06F 11/1471* (2013.01); *G06F 2201/84* (2013.01)

(56) References Cited

U.S. PATENT DOCUMENTS

| | | | |
|---|---|---|---|
| 5,794,024 | A | 8/1998 | Gotta et al. |
| 5,978,900 | A | 11/1999 | Liu et al. |
| 6,119,223 | A | 9/2000 | Witt |
| 7,506,139 | B2 | 3/2009 | Burky et al. |
| 10,877,768 | B1* | 12/2020 | Priyadarshi ........... G06F 9/3855 |
| 2002/0144090 | A1 | 10/2002 | Ronen et al. |
| 2004/0034757 | A1* | 2/2004 | Gochman ............... G06F 9/383 |
| | | | 711/219 |
| 2010/0274961 | A1 | 10/2010 | Golla et al. |
| 2011/0264896 | A1* | 10/2011 | Parks .................. G06F 9/30145 |
| | | | 712/221 |
| 2011/0264897 | A1* | 10/2011 | Henry ................... G06F 9/3861 |
| | | | 712/226 |
| 2013/0179665 | A1 | 7/2013 | Jackson |
| 2014/0281393 | A1* | 9/2014 | Iyengar ................ G06F 9/3855 |
| | | | 712/208 |
| 2015/0019843 | A1 | 1/2015 | Krishna et al. |
| 2017/0075692 | A1 | 3/2017 | Kothinti Naresh et al. |
| 2017/0277535 | A1 | 9/2017 | Le et al. |
| 2020/0097296 | A1 | 3/2020 | Priyadarshi et al. |
| 2020/0174796 | A1 | 6/2020 | Swanson et al. |
| 2020/0401408 | A1* | 12/2020 | Burky .................... G06F 9/384 |

OTHER PUBLICATIONS

"International Search Report and Written Opinion Issued in PCT Application No. PCT/US20/038027", dated Sep. 29, 2020, 14 Pages.

* cited by examiner

US 11,061,677 B1

RECOVERING REGISTER MAPPING STATE OF A FLUSHED INSTRUCTION EMPLOYING A SNAPSHOT OF ANOTHER REGISTER MAPPING STATE AND TRAVERSING REORDER BUFFER (ROB) ENTRIES IN A PROCESSOR

FIELD OF THE DISCLOSURE

The technology of the disclosure relates to instruction processing in an instruction pipeline in a computer processor ("processors") and, more particularly, to recovering a state of structures of an instruction pipeline in a processor after speculative misprediction of a conditional control (e.g., branch) instruction.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions") that process input data and produce a data result. A data result generated in an instruction sequence may be an interim data stored for use as input data to a subsequent instruction. To avoid delays that would be caused by storing the interim data in external memory and then reading the interim data back into the processor from external memory, the interim data can be stored temporarily in a permanent register within the processor.

Instruction set architectures (ISAs) make a certain number of registers available to be used as operands in instructions. However, there may not be enough registers available in the ISA to avoid multiple instructions in the instruction pipeline using the same register. Therefore, it is generally desired to provide more physical registers to store interim data than a number of logical registers defined in the ISA. Thus, for different instructions, the processor can assign the logical registers available in the ISA to different physical registers. The processor maps the logical registers in processed instructions to the physical registers via a rename map table to keep track of the actual physical register where the data is stored. The processor includes a register renaming circuit in the instruction pipeline to rename logical registers to physical registers for accessing data in a physical register for execution of the instruction. A logical register-to-physical register mapping in the rename map table is freed up when the physical register is obsolete, complete, and no longer in use. Obsolete means a newer write to the same logical register has been committed. Complete means the result corresponding to the physical register has been written into the physical register file. No longer in use means that all instructions that need to consume the physical register are past the point of reading the register file. The processor stores renaming information associated with each instruction in program order in the reorder buffer (ROB), and keeps the latest rename state in the rename map table. Once an executed instruction is committed, logical register-to-physical register renaming of the instruction is saved to the committed map table (CMT).

Control hazards can occur in an instruction pipeline where the next instruction in the instruction pipeline cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional branch instruction may redirect the flow path of instruction execution based on a condition evaluated when the condition of the control branch instruction is executed. As a result, the processor may have to stall the fetching of additional instructions until a conditional branch instruction has executed, resulting in reduced processor performance and increased power consumption. One approach for maximizing processor performance involves utilizing a prediction circuit to speculatively predict the result of a condition of a conditional branch instruction. Processing of new instructions based on the prediction may include changes to the register mapping information in the rename map table. However, a mispredicted branch instruction necessitates the performance of a misprediction recovery process, whereby the instruction pipeline is flushed and the instruction pipeline fetch unit is redirected to fetch new instructions starting from the address of the conditional branch instruction. As part of this misprediction recovery process, the rename map table that contains register mapping information for uncommitted instructions in the instruction pipeline has to be returned to its previous state of register mapping before the instructions in the correct branch are processed. Because the ROB keeps the latest register rename states in the rename map table for uncommitted instructions, the instruction entries containing the latest register rename states in the ROB can be used to restore the previous state of register mapping that executed prior to the instruction that was speculatively mispredicted. It is desirable to restore the register states in the processor in misprediction recovery as quickly as possible to minimize performance losses due to speculative mispredictions.

SUMMARY

Exemplary aspects disclosed herein include recovering a register mapping state of a flushed instruction employing a snapshot of another register mapping state and traversing reorder buffer (ROB) entries in a processor. Instructions in a processor pipeline are to be committed in program order even if they are processed out of order for efficiency. Since all instructions use the same set of logical registers, different instructions may use the same logical register operand for different purposes. For this reason, the logical register operands for an instruction are mapped to unique physical registers using a rename map table. The rename map table is updated as each new instruction enters the processor pipeline to maintain a most recent logical register-to-physical register mapping. Updates from individual instructions are stored in corresponding reorder buffer (ROB) entries in program order. When the processor pipeline is flushed due to a target instruction that fails to execute as intended, all instructions following the target instruction may be flushed from the processor pipeline, and the state of the rename map table is returned to the state of logical register-to-physical register mapping that existed before the target instruction entered the processor pipeline.

In this regard, in an exemplary aspect, a register mapping circuit for recovering a register mapping state associated with a flushed instruction by traversing ROB entries from one with a snapshot of another register mapping state is disclosed. The register mapping circuit includes a ROB control circuit, a snapshot circuit, and a register rename recovery circuit (RRRC). The ROB control circuit allocates ROB entries in a ROB to uncommitted instructions entering a pipeline of the processor. The uncommitted instructions include a target instruction and may include other instructions that are older and younger than the target instruction. The ROB entries include a target ROB entry allocated to the target instruction and other ROB entries allocated to the other instructions. The snapshot circuit is configured to capture snapshots of the rename map table state corresponding to only a subset of the uncommitted instructions that could be flushed. For example, the snapshot circuit may be configured to only capture a snapshot of the rename map table for every given number of instructions, or for only predefined ROB entries in the ROB. The snapshot circuit stores each rename map table snapshot in association with a snapshot ROB entry allocated to the corresponding instruction.

In exemplary aspects disclosed herein, when the RRRC receives an indication of a flush of instructions in the pipeline from the target instruction, the RRRC restores the logical register-to-physical register mapping state of the rename map table to a state corresponding to the target instruction based on the rename map table snapshot stored in association with the snapshot ROB entry. That is, the RRRC first restores the rename map table to the state of a snapshot from another instruction in the ROB and then walks through the updates stored in the ROB entries of intervening instructions to recover the register mapping state of the target instruction. The RRRC first restores the rename map table to the state of a snapshot from another instruction in the ROB, because the snapshot circuit is not configured to capture a snapshot of the rename map table for every instruction or even for every instruction that can be flushed. In this manner, the RRRC may be required to walk the ROB between an entry allocated to a target instruction and an entry of another instruction with a captured snapshot of the rename map table to restore the rename map table. Therefore, the snapshot circuit does not have to capture rename map table snapshots for every instruction that may be flushed, and the amount of snapshot resources needed by the register mapping circuit is reduced compared to a snapshot-based recovery. In addition, using rename map table snapshots captured in association with uncommitted instructions significantly reduces the number of ROB entries to be walked to or from the target ROB entry in a typical flush compared to a typical ROB walking method.

In this regard, in an exemplary aspect, a register mapping circuit in a processor is disclosed. The register mapping circuit includes a ROB control circuit configured to allocate a plurality of ROB entries in a ROB to a plurality of uncommitted instructions in a processor pipeline, wherein the plurality of uncommitted instructions comprises a target instruction and other instructions, the plurality of ROB entries comprises a target ROB entry allocated to the target instruction and other ROB entries allocated to the other instructions, and the other instructions comprise older instructions ahead of the target instruction in the processor pipeline and younger instructions behind the target instruction in the processor pipeline. The register mapping circuit also includes a snapshot circuit configured to capture a rename map table snapshot comprising a logical register-to-physical register mapping state of a rename map table, the rename map table snapshot corresponding to a first other instruction of the other instructions, and store the rename map table snapshot in association with a snapshot ROB entry allocated to the first other instruction of the other instructions. The register mapping circuit further includes a register rename recovery circuit, configured to receive an indication of a flush of instructions in the processor pipeline from the target instruction, and in response to the indication of the flush, restore the logical register-to-physical register mapping state of the rename map table to a state corresponding to the target instruction based on the rename map table snapshot stored in association with the snapshot ROB entry.

In another exemplary aspect herein, a register mapping circuit including a ROB control circuit configured to allocate a ROB entry of a plurality of ROB entries in a ROB to each of a plurality of uncommitted instructions in a processor pipeline is disclosed. In the register mapping circuit, the plurality of uncommitted instructions comprises a target instruction and other instructions, the plurality of ROB entries comprises a target ROB entry allocated to the target instruction and other ROB entries allocated to the other instructions, and the other instructions comprise older instructions ahead of the target instruction in the processor pipeline and younger instructions behind the target instruction in the processor pipeline. The register mapping circuit includes a snapshot circuit configured to capture at least one rename map table snapshot each comprising a logical register-to-physical register mapping state of a rename map table, each rename map table snapshot corresponding to a respective one of the other instructions, and store the at least one rename map table snapshot in association with one of the other ROB entries allocated to the respective one of the other instructions. The register mapping circuit includes a register rename recovery circuit, configured to receive an indication of a flush of instructions in the processor pipeline from the target instruction, and in response to the indication of the flush, determine a first number of the other ROB entries between the target ROB entry and a closest one of the other ROB entries associated with a rename map table snapshot is greater than a second number of the other ROB entries from the target ROB entry to an end ROB entry, the end ROB entry comprising one of a head ROB entry allocated to an oldest instruction of the older instructions and a tail ROB entry allocated to a youngest instruction of the younger instructions. The register rename recovery circuit is further configured to, in response to the end ROB entry comprising the head ROB entry, restore the logical register-to-physical register mapping state of the rename map table based on a committed map table (CMT) and register mapping information in the other ROB entries from the head ROB entry to the target ROB entry and, in response to the end ROB entry comprising the tail ROB entry, restore the logical register-to-physical register mapping state of the rename map table based on the rename map table and register mapping information in the other ROB entries from the tail ROB entry to the target ROB entry.

In another exemplary aspect, a method of a register mapping circuit in a processor is disclosed. The method includes allocating a plurality of ROB entries in a ROB to a plurality of uncommitted instructions in a processor pipeline, including allocating a target ROB entry of the plurality of ROB entries to a target instruction of the plurality of uncommitted instructions and allocating other ROB entries of the plurality of ROB entries to other instructions of the plurality of uncommitted instructions, wherein the other instructions comprise older instructions ahead of the target instruction in the processor pipeline and younger instructions behind the target instruction in the processor pipeline. The method further includes capturing a rename map table snapshot comprising a logical register-to-physical register mapping state of a rename map table, the rename map table snapshot corresponding to a first other instruction of the other instruction and storing the rename map table snapshot in association with a snapshot ROB entry allocated to the first other instruction of the other instructions. The method still further includes receiving an indication of a flush of instructions in the processor pipeline from the target instruction and, in response to the indication of the flush, restoring the logical register-to-physical register mapping state of the rename map table to a state corresponding to the target instruction based on the rename map table snapshot stored in association with the snapshot ROB entry.

In another exemplary aspect, a method performed in a register mapping circuit is disclosed. The method includes allocating a plurality of ROB entries in a ROB to a plurality of uncommitted instructions in a processor pipeline, the allocating includes allocating a target ROB entry of the plurality of ROB entries to a target instruction of the plurality of uncommitted instructions, and allocating other ROB entries of the plurality of ROB entries to other instructions of the plurality of uncommitted instructions, wherein the other instructions comprise older instructions ahead of the target instruction in the processor pipeline and younger instructions behind the target instruction in the processor pipeline. The method further includes capturing at least one rename map table snapshot each comprising a logical register-to-physical register mapping state of a rename map table, each rename map table snapshot corresponding to a respective one of the other instructions, and storing the at least one rename map table snapshot in association with one of the other ROB entries allocated to the respective one of the other instructions. The method further includes receiving an indication of a flush of instructions in the processor pipeline from the target instruction, and in response to the indication of the flush, determining a first number of the other ROB entries between the target ROB entry and a closest one of the other ROB entries associated with a rename map table snapshot is greater than a second number of the other ROB entries from the target ROB entry to an end ROB entry, the end ROB entry comprising one of a head ROB entry allocated to an oldest instruction of the older instructions and a tail ROB entry allocated to a youngest instruction of the younger instructions. The method still further includes, in response to the end ROB entry comprising the head ROB entry, restoring the logical register-to-physical register mapping state of the rename map table based on a CMT and register mapping information in the other ROB entries from the head ROB entry to the target ROB entry and, in response to the end ROB entry comprising the tail ROB entry, restoring the logical register-to-physical register mapping state of the rename map table based on the rename map table and register mapping information in the other ROB entries from the tail ROB entry to the target ROB entry.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
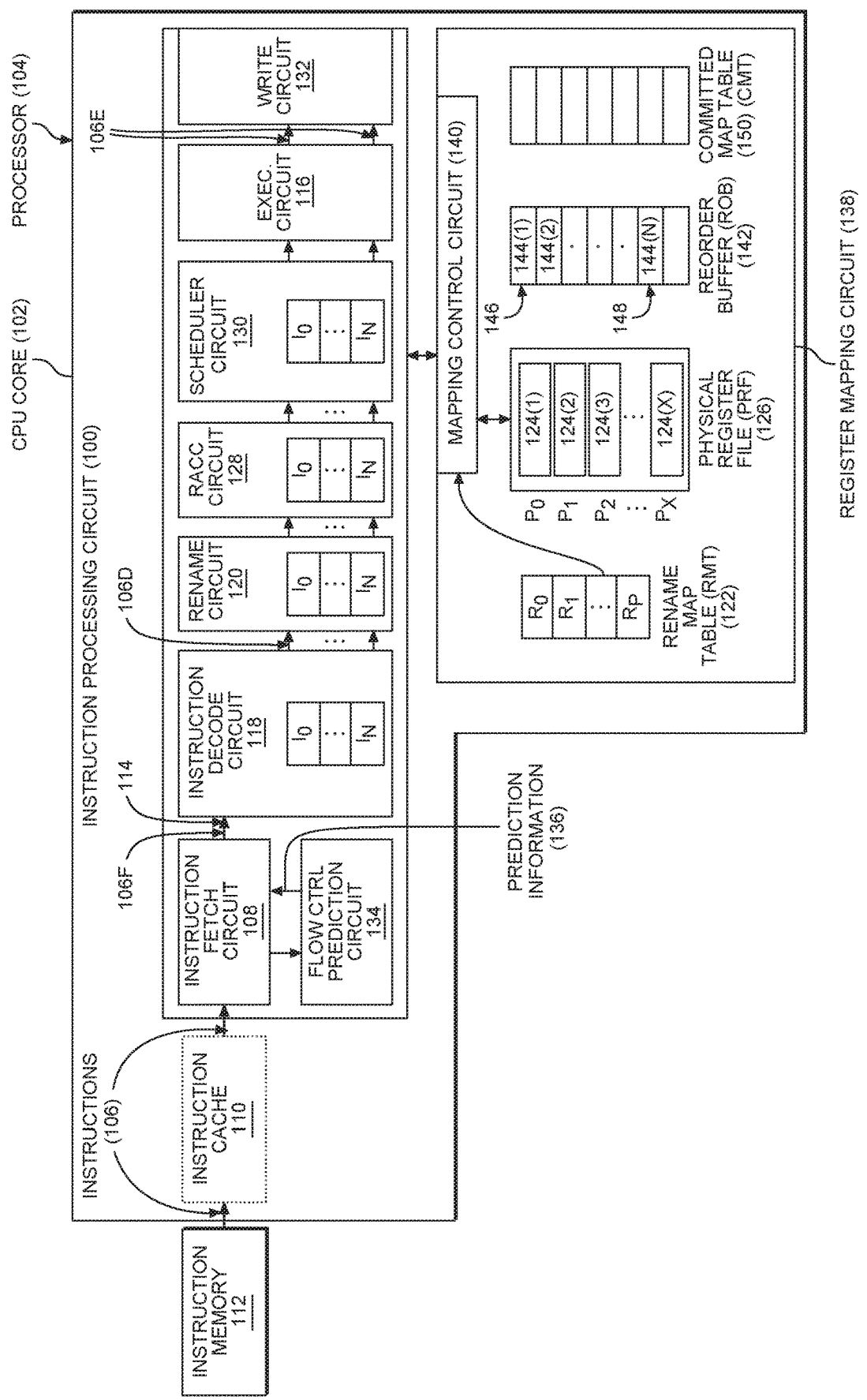
FIG. 1 is a schematic diagram of an instruction processing circuit including instruction pipelines for processing computer instructions for execution, wherein a register mapping circuit maintains program order of committed instructions in conjunction with speculative instruction flow control.

Exemplary aspects disclosed herein include recovering a register mapping state of a flushed instruction employing a snapshot of another register mapping state and traversing reorder buffer (ROB) entries in a processor. Instructions in a processor pipeline are to be committed in program order even if they are processed out of order for efficiency. Since all instructions use the same set of logical registers, different instructions may use the same logical register operand for different purposes. For this reason, the logical register operands for an instruction are mapped to unique physical registers using a rename map table. The rename map table is updated as each new instruction enters the processor pipeline to maintain a most recent logical register-to-physical register mapping. Updates from individual instructions are stored in corresponding reorder buffer (ROB) entries in program order. When the processor pipeline is flushed due to a target instruction that fails to execute as intended, all instructions following the target instruction may be flushed from the processor pipeline, and the state of the rename map table is returned to the state of logical register-to-physical register mapping that existed before the target instruction entered the processor pipeline.

In this regard, in an exemplary aspect, a register mapping circuit for recovering a register mapping state associated with a flushed instruction by traversing ROB entries from one with a snapshot of another register mapping state is disclosed. The register mapping circuit includes a ROB control circuit, a snapshot circuit, and a register rename recovery circuit (RRRC). The ROB control circuit allocates ROB entries in a ROB to uncommitted instructions entering a pipeline of the processor. The uncommitted instructions include a target instruction and may include other instructions that are older and younger than the target instruction. The ROB entries include a target ROB entry allocated to the target instruction and other ROB entries allocated to the other instructions. The snapshot circuit is configured to capture snapshots of the rename map table state corresponding to only a subset of the uncommitted instructions that could be flushed. For example, the snapshot circuit may be configured to only capture a snapshot of the rename map table for every given number of instructions, or for only predefined ROB entries in the ROB. The snapshot circuit stores each rename map table snapshot in association with a snapshot ROB entry allocated to the corresponding instruction.

In exemplary aspects disclosed herein, when the RRRC receives an indication of a flush of instructions in the pipeline from the target instruction, the RRRC restores the logical register-to-physical register mapping state of the rename map table to a state corresponding to the target instruction based on the rename map table snapshot stored in association with the snapshot ROB entry. That is, the RRRC first restores the rename map table to the state of a snapshot from another instruction in the ROB and then walks through the updates stored in the ROB entries of intervening instructions to recover the register mapping state of the target instruction. The RRRC first restores the rename map table to the state of a snapshot from another instruction in the ROB, because the snapshot circuit is not configured to capture a snapshot of the rename map table for every instruction or even for every instruction that can be flushed. In this manner, the RRRC may be required to walk the ROB between an entry allocated to a target instruction and an entry of another instruction with a captured snapshot of the rename map table to restore the rename map table. Therefore, the snapshot circuit does not have to capture rename map table snapshots for every instruction that may be flushed, and the amount of snapshot resources needed by the register mapping circuit is reduced compared to a snapshot-based recovery. In addition, using rename map table snapshots captured in association with uncommitted instructions significantly reduces the number of ROB entries to be walked to or from the target ROB entry in a typical flush compared to a typical ROB walking method.

FIG. 1 illustrates an instruction processing circuit 100 that is provided in a CPU core 102 in a processor 104. The instruction processing circuit 100 includes one or more instruction pipelines $I_0$-$I_N$ for processing fetched computer instructions 106F fetched by an instruction fetch circuit 108 for execution from a series of instructions 106 stored in an instruction cache memory 110 or instruction memory 112, as examples. The instruction fetch circuit 108 is configured to provide fetched instructions 106F to the one or more instruction pipelines $I_0$-$I_N$ as an instruction stream 114 in the instruction processing circuit 100 where the fetched instructions 106F are to be pre-processed before reaching an execution circuit 116 to be executed. The instruction pipelines $I_0$-$I_N$ are provided across different processing circuits or stages of the instruction processing circuit 100 to pre-process and process the fetched instructions 106F in a series of steps that can be performed concurrently to increase throughput prior to execution of the fetched instructions 106F by the execution circuit 116.

With continuing reference to FIG. 1, the instruction processing circuit 100 includes an instruction decode circuit 118 configured to decode the fetched instructions 106F fetched by the instruction fetch circuit 108 into decoded instructions 106D to determine the instruction type and actions required. The decoded instructions 106D are placed in one or more of the instruction pipelines $I_0$-$I_N$ and are next provided to a rename circuit 120 in the instruction processing circuit 100 to determine if any register names in the decoded instructions 106D need to be renamed to avoid any register dependencies that would prevent parallel or out-of-order processing. The rename circuit 120 is configured to call upon a rename map table (RMT) 122 to rename a logical source register operand and/or a logical destination register operand of a decoded instruction 106D to available physical registers 124(1)-124(X) ($P_0$, $P_1$, . . . , $P_x$) in a physical register file (PRF) 126. The RMT 122 contains a plurality of mapping entries each corresponding to a respective logical register $R_0$-$R_P$. The mapping entries are configured to store information in the form of an address pointer to point to a physical register 124(1)-124(X) in the PRF 126. Each physical register 124(1)-124(X) in the PRF 126 is configured to store data for a source and/or destination register operand of a decoded instruction 106D.

The instruction processing circuit 100 also includes a register access (RACC) circuit 128 configured to access one of the physical registers 124(1)-124(X) in the PRF 126 named by a mapping entry of one of the logical registers $R_0$-$R_P$ indicated as a source register operand of a decoded instruction 106D. The RACC circuit 128 retrieves a value in the PRF 126 produced by a previously executed instruction 106E in the execution circuit 116. Also, in the instruction processing circuit 100, a scheduler circuit 130 is provided in the instruction pipelines $I_0$-$I_N$ and is configured to store decoded instructions 106D in reservation entries until all source register operands for the decoded instructions 106D are available. A write circuit 132 is provided in the instruction processing circuit 100 to write back (i.e., commit) produced values from executed instructions 106E to memory, such as the PRF 126, a data cache memory system (not shown), or a main memory (not shown).

With continuing reference to FIG. 1, the instruction processing circuit 100 also includes a flow control prediction circuit 134. The flow control prediction circuit 134 is configured to speculatively predict the outcome of a condition of a fetched conditional flow control instruction 106F, such as a conditional branch instruction, that controls which path in the instruction control flow path of the instruction stream 114 is fetched into the instruction pipelines $I_0$-$I_N$ for execution. With accurate speculative prediction methods, the condition of the fetched conditional flow control instruction 106F does not have to be resolved in execution by the execution circuit 116 before the instruction processing circuit 100 can continue processing speculatively fetched instructions 106F. The prediction made by the flow control prediction circuit 134 can be provided as prediction information 136 to the instruction fetch circuit 108 to be used by the instruction fetch circuit 108 to determine the next instructions 106 to fetch.

However, if the condition of the conditional flow control instruction 106F is determined to have been mispredicted when the conditional flow control instruction 106F is executed in the execution circuit 116, the instruction 106F is interrupted. The speculatively fetched instructions 106F that were processed in the instruction pipelines $I_0$-$I_N$ in the instruction processing circuit 100 behind or after the conditional flow control instruction 106F are flushed because the direction of program flow is not as predicted and will not include processing of these instructions. Load or store instructions 106F for which a calculated address of a memory location may be invalid or cannot be accessed for some other reason can also cause a flush of subsequent instructions 106F. The program flow of the instruction processing circuit 100 is interrupted under these conditions, and the instruction processing circuit 100 is returned to a previous state. The previous state to which the instruction processing circuit is restored depends on the type of interrupted instruction and may be a state that existed either prior to or as a result of the instruction 106F that is interrupted, which is the target instruction of the flush. The CPU core 102 includes a register mapping circuit 138, which includes the RMT 122 and the PRF 126, to maintain logical register-to-physical register mapping. The register mapping circuit 138 includes a mapping control circuit 140 that, in case of a flush due to a target instruction, can restore a logical register-to-physical register mapping state that may have been changed by instructions 106 that entered the instruction pipelines $I_0$-$I_N$ of the processing circuit 100 after the target instruction 106.

With continuing reference to FIG. 1, the register mapping circuit 138 also includes a reorder buffer (ROB) 142 containing entries ("ROB entries") 144(1)-144(N) allocated to instructions 106 that are being processed by the instruction processing circuit 100 but have not been committed ("uncommitted instructions"). A ROB index identifies the position of each ROB entry 144(1)-144(N) in the ROB 142. The ROB entries 144(1)-144(N) are allocated sequentially in program order to the instructions 106. A ROB entry 144(1)-144(N) allocated to the oldest uncommitted instruction 106 in the ROB 142 is known as a head entry 146. The head entry 146 changes to the next ROB entry 144(1)-144(N) when the oldest uncommitted instruction 106 is committed. A new ROB entry 144(1)-144(N), allocated to the youngest uncommitted instruction 106 to enter the instruction pipelines $I_0$-$I_N$, is known as a tail entry 148. The tail entry 148 changes each time a new ROB entry 144(1)-144(N) is allocated to a new instruction 106. The ROB index for each instruction 106 is reported back to the instruction processing circuit 100 when the ROB entry 144(1)-144(N) is initially allocated to an instruction 106. In this way, the instruction processing circuit 100 can identify a ROB index allocated to the target instruction 106. Information about changes to the mapping of the logical registers $R_0$-$R_P$ in the RMT 122 as a result of an instruction 106 ("register mapping information") is stored in association with the ROB entry 144(1)-144(N) allocated to the instruction 106. The register mapping information stored for uncommitted instructions 106 is used to achieve RMT 122 recovery in response to a flush.

With continuing reference to FIG. 1, the register mapping circuit 100 also includes a committed map table (CMT) 150 of mapping entries in which the logical register-to-physical register mapping of each logical register $R_0$-$R_P$ of the processor 104 is stored as a result of committed instructions 106. The CMT 150 is only updated when an instruction 106 is committed. The CMT 150 is not changed in response to a flush. The mapping control circuit 140 controls the register mapping circuit 138, which includes managing flush recovery of the RMT 122.

Figure 2:
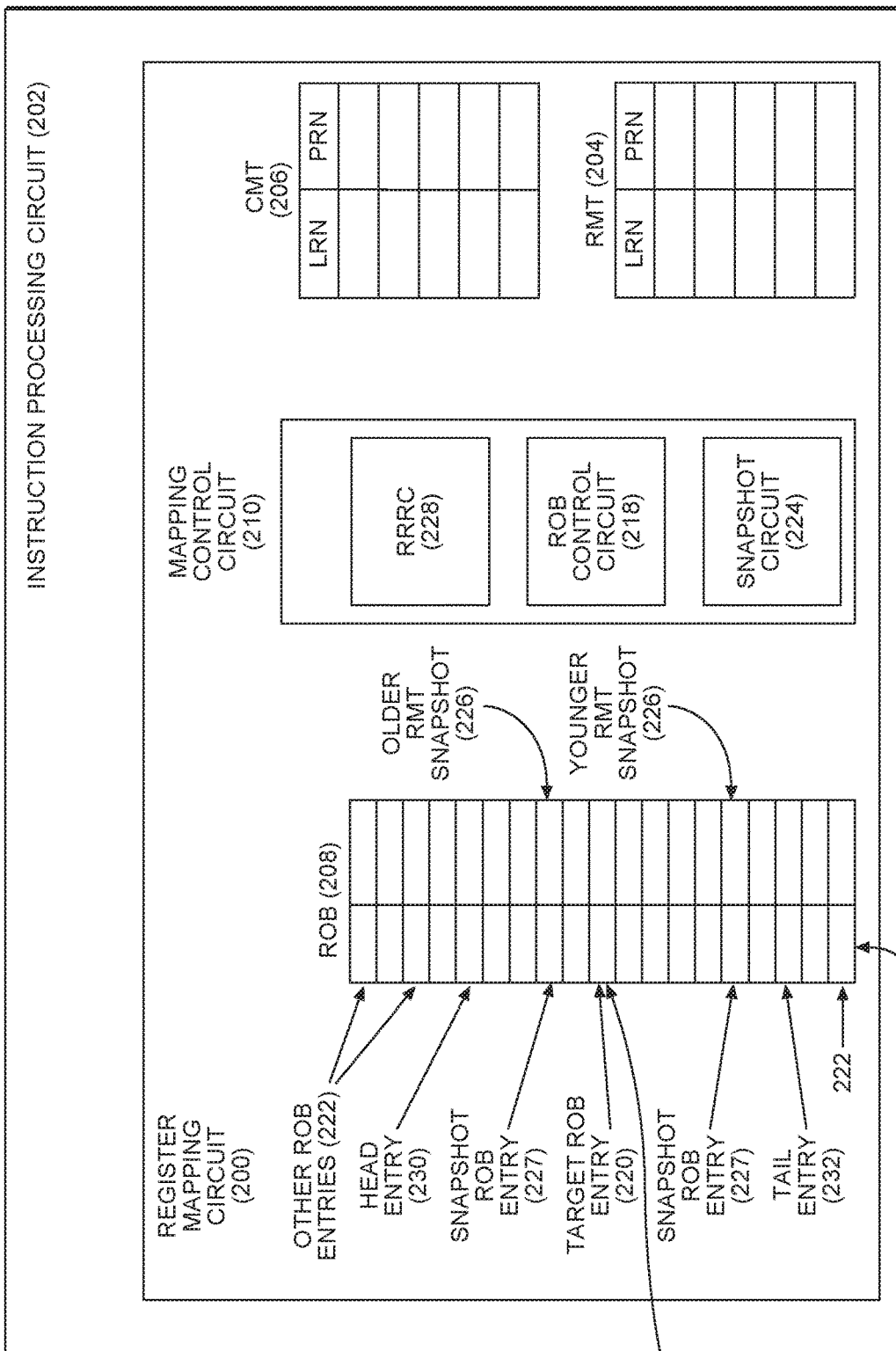
FIG. 2 is a schematic diagram of an instruction processing circuit including an exemplary register mapping circuit configured to restore a register mapping state of a rename map table in response to an indication of a target instruction based on a snapshot of the rename map table corresponding to another instruction.

FIG. 2 is an illustration of an exemplary register mapping circuit 200 in an instruction processing circuit 202 according to the present disclosure. The register mapping circuit 200 performs register mapping as described with respect to the register mapping circuit 138 in FIG. 1, but the register mapping circuit 200 is optimized, as described below, for logical register-to-physical register mapping state recovery from a pipeline flush of a target instruction by employing a snapshot of a RMT 204 corresponding to an instruction other than a target instruction. The register mapping circuit 200 in FIG. 2 includes the RMT 204, a CMT 206 and a ROB 208. The RMT 204 and the CMT 206 include entries containing a logical register name (LRN) and an associated physical register name (PRN) to indicate a mapping or relationship of the logical register to the physical register for an instruction. The physical register names identify physical registers in a physical register file that is not shown in FIG. 2. The register mapping circuit 200 is controlled by a mapping control circuit 210, which interfaces to the instruction processing circuit 202.

Although not shown in FIG. 2, the instruction processing circuit 202 includes circuits for each stage of the instruction pipelines $I_0$-$I_N$ of the instruction processing circuit 100 in FIG. 1, including the instruction decode circuit 118, the rename circuit 120, the RACC circuit 128, and the scheduler circuit 130. The processing circuit 202 also includes, though not shown, the circuits of the instruction processing circuit 100 in FIG. 1 at each end of the instruction pipelines $I_0$-$I_N$, including the instruction fetch circuit 108, the flow control prediction circuit 134, the execution circuit 116, and the write circuit 132, and may include the optional instruction cache 110. These circuits operate in the instruction processing circuit 202 as described above with regard to the instruction processing circuit 100 in FIG. 1.

As instructions 212 enter the instruction pipelines $I_0$-$I_N$ in the instruction processing circuit 202, the logical register-to-physical register mapping state ("register mapping state") in the RMT 204 is updated. The register mapping state in the RMT 204 includes the state of logical register-to-physical register mapping of all architected registers of the instruction processing circuit 202 as of the last instruction 212 entering the instruction pipelines $I_0$-$I_N$. The register mapping state of the RMT 204 is updated with register mapping information 214 (i.e., information indicating a physical register to which a logical register is mapped for the corresponding instruction) of each new instruction that enters the instruction pipelines $I_0$-$I_N$. When a misprediction or other interruption occurs, the instruction flow is interrupted and all instructions in the instruction pipelines $I_0$-$I_N$ after a target instruction 216 (i.e., all "younger instructions 212") are flushed. The target instruction 216 is the instruction causing flow control to change and is referred to herein as the target of the flush. Instructions ahead of the target instruction 216 ("older instructions 212") are unaffected by the flush. Depending on the type of the target instruction 216, the register mapping information 214 in the target instruction 216 may or may not be reversed (i.e., undone) when recovering from a flush.

Under normal operation, a ROB control circuit 218 allocates a target ROB entry 220 in the ROB 208 to the target instruction 216. The ROB control circuit 218 also allocates other ROB entries 222 to other instructions 212 as they enter the instruction pipelines $I_0$-$I_N$. The other instructions 212 are all uncommitted instructions 212 that include older instructions 212 and younger instructions 212. As described further below, a snapshot circuit 224 in the register mapping circuit 200 captures a snapshot of the RMT 204 ("RMT snapshot 226"), which is a copy of all register mapping information 214 included in the register mapping state of the RMT 204 as of the newest instruction 212 that entered the instruction pipelines $I_0$-$I_N$. The snapshot circuit 224 captures the RMT snapshot 226 to correspond to an instruction 212, and the RMT snapshot 226 is associated with a snapshot ROB entry 227 in the ROB 208. The RMT snapshot 226 may be captured before or after the RMT 204 is modified by any register mapping information 214 of the corresponding instruction 212.

Storing a RMT snapshot 226 in association with the snapshot ROB entry 227 may involve storing the RMT snapshot 226 within the snapshot ROB entry 227 of the ROB 208, or storing the RMT snapshot 226 in another register, table, or memory that can be referenced by, for example, an index of the snapshot ROB entry 227. Other means for storing a RMT snapshot 226 in association with a ROB entry 222 are within the scope of the present disclosure. To identify which of the ROB entries 222 are snapshot ROB entries 227, locations of the snapshot ROB entries 227 associated with an RMT snapshot 226 may be tracked or recorded in a list or table, for example. Alternatively, each ROB entry 222 may include an indicator and the indicator in the snapshot ROB entries 227 may be updated to indicate that the snapshot ROB entry 227 is associated with a RMT snapshot 226. As disclosed herein, the snapshot circuit 224 of the register mapping circuit 200 does not capture a RMT snapshot 226 corresponding to every instruction 212 that could be the target of a flush.

When the register mapping circuit 200 receives an indication of a flush of instructions in the instruction pipelines $I_0$-$I_N$, and the target instruction 216 is identified, a register rename recovery circuit (RRRC) 228 receives the flush indication. The flush indication may be a voltage or current level of an electrical signal received in the register mapping circuit 200. In response to the flush indication, the RRRC 228 restores the register mapping state of the RMT 204 to a state corresponding to the target instruction 216. Sometimes the snapshot circuit 224 will capture a RMT snapshot 226 corresponding to the target instruction 216, as discussed below with reference to FIG. 4. In this case, the register mapping state of the RMT 204 may be restored by simply copying the RMT snapshot 226 into the RMT 204. However, as noted above, the snapshot circuit 224 of the register mapping circuit 200 does not capture a RMT snapshot 226 corresponding to every instruction 212 that could be the target of a flush due to the significant snapshot resources required under such approach. In a case in which there is no RMT snapshot 226 associated with a target instruction 216, the register mapping state of the RMT 204 corresponding to the target instruction 216 may be restored based on a RMT snapshot 226 that is stored in association with a snapshot ROB entry 227 allocated to one of the other instructions 212.

For a better understanding of the operation of the register mapping circuit 200, for restoring the register mapping state of the RMT 204 under various circumstances, detailed descriptions of several scenarios are provided with reference to FIG. 2. In a first example, the RRRC 228 can employ a RMT snapshot 226 that is older than the target instruction 216. In a first situation under this example, a RMT snapshot 226 corresponding to the next older uncommitted instruction 212 (i.e., next older than the target instruction 216) was captured by the snapshot circuit 224. The RMT snapshot 226 at the next older instruction 212 is associated with a snapshot ROB entry 227 adjacent to the target ROB entry 220. Thus, none of the other ROB entries 222 is between the target ROB entry 220 and the snapshot ROB entry 227. As noted above, the RMT snapshot 226 may be captured before or after any register mapping information 214 of the next older instruction 212 was applied to the RMT 204. If the RMT snapshot 226 was captured after the register mapping information of the next older instruction 212 was applied, then the RMT snapshot would correspond to the register mapping state of the RMT 204 immediately before the target instruction 216, and if the register mapping information of the target instruction 216 is to be flushed, then the register mapping state of the RMT 204 is restored by simply copying the RMT snapshot 226 into the RMT 204. Copying a RMT snapshot 226 corresponding to an older instruction 212 into the register mapping state of the RMT 204 restores the register mapping state of the RMT 204 to a state at which the older instruction 212 was the newest instruction 212 entering the instruction pipelines $I_0$-$I_N$, effectively undoing all changes to the RMT 204 since that state existed.

In a second situation, which is a variation on the above first situation, if the RMT snapshot 226 corresponding to the next older uncommitted instruction 212 was captured by the snapshot circuit 224 before the register mapping information 214 of the next older instruction 212 was applied to the RMT 204, the effect of the register mapping information 214 of the next older instruction 212 will need to be reversed. Thus, after the RMT snapshot 226 is copied into the RMT 204, the RRRC 228 will obtain the register mapping information of the next older instruction 212 from the other ROB entry 222 allocated to the next older instruction 212 and restore the register mapping state of the RMT 204 to a state corresponding to the target instruction 216.

In a third situation, which is a variation to either of the above first or second situations, the register mapping information of the target instruction 216 is not to be flushed due to its instruction type. Thus, after the RMT snapshot 226 is copied into the RMT 204, the RRRC 228 will obtain the register mapping information 214 of the target instruction 216 from the target ROB entry 220 and modify register mapping information 214 in the register mapping state of the RMT 204 accordingly. Modifying the register mapping state of the RMT 204 based on register mapping information 214 from the target ROB entry 220 or from one of the other ROB entries 222 after copying the contents of an RMT snapshot 226 corresponding to an older instruction 212 into the RMT 204 is redoing or reapplying the changes made by such register mapping information 214.

In a fourth situation under the first example, a RMT snapshot 226 corresponding to the next older uncommitted instruction 212 was not captured by the snapshot circuit 224. In this situation, a nearest RMT snapshot 226 corresponding to another instruction 212 corresponds to an older instruction 212 allocated to a snapshot ROB entry 227 that is not next to the target ROB entry 220. The snapshot ROB entry 227 may be separated from the target ROB entry 220 by any number of other ROB entries 222 depending on the size of the ROB 208. In this situation, the RRRC 228 first copies the contents of the RMT snapshot 226 corresponding to the older ROB instruction 212 into the RMT 204. Next, if the second situation above applies (i.e., the RMT snapshot 226 was captured before the register mapping information 214 of the older instruction 212 was applied to the RMT 204), the RRRC 228 obtains the register mapping information 214 from the snapshot ROB entry 227 and modifies the RMT 204. Then, for each of the other ROB entries 222 between the snapshot ROB entry 227 and the target ROB entry 220, the RRRC 228 obtains the register mapping information 214 from the other ROB entries 222 and modifies the RMT 204 based on the register mapping information 214 from the other ROB entries 222 in sequence from the snapshot ROB entry 227 to the target ROB entry 220. This sequential application of register mapping information 214 from the other ROB entries 222 is referred to herein as "walking" the other ROB entries 222. As in the third situation above, if the target instruction 216 is not to be flushed, the register mapping information 214 in the target ROB entry 220 allocated to the target instruction 216 may also be obtained and applied to the RMT 204 to restore the register mapping state of the RMT 204.

In the above example, even though the snapshot ROB entry 227 may be separated from the target ROB entry 220 by a number of other ROB entries 222, the snapshot ROB entry 227 is still closer to the target ROB entry 220 than a current head entry 230 of the ROB 208, which is allocated to the oldest uncommitted instruction 212. Therefore, walking the other ROB entries 222 from the RMT snapshot 226 associated with the snapshot ROB entry 227 requires walking a smaller number of the other ROB entries 222 than would be needed if the register mapping state of the RMT 204 is restored from the CMT 206, as will be explained further below.

In a second example, the RRRC 228 may employ a RMT snapshot 226 that is younger than the target instruction 216. In a fifth situation, under the second example, the younger RMT snapshot 226 corresponding to the next younger uncommitted instruction 212 may have been captured by the snapshot circuit 224 before or after any register mapping information 214 of the next younger instruction 212 was applied to the RMT 204. The younger RMT snapshot 226 is associated with a snapshot ROB entry 227 adjacent to the target ROB entry 220. Thus, none of the other ROB entries 222 is between the target ROB entry 220 and the snapshot ROB entry 227. If the younger RMT snapshot 226 was captured before the register mapping information 214 of the next younger instruction 212 was applied, then the RMT snapshot 226 would correspond to the register mapping state of the RMT 204 immediately after the target instruction 216. If the register mapping information 214 of the target instruction 216 is not to be flushed, then the register mapping state of the RMT 204 may be restored by copying the younger RMT snapshot 226 into the RMT 204. Copying a younger RMT snapshot 226 corresponding to a younger instruction 212 into the register mapping state of the RMT 204 restores the register mapping state of the RMT 204 to the state at which the younger instruction 212 was the newest instruction, effectively undoing all changes to the RMT 204 from any other instructions 212 that are even younger than the younger instruction 212 (i.e., from the younger instruction 212 to the youngest instruction 212 to which a tail entry 232 of the ROB 208 is allocated).

In a sixth situation, which is variation on the above fifth situation under the second example, if the younger RMT snapshot 226 corresponding to the next younger uncommitted instruction 212 was captured by the snapshot circuit 224 after the register mapping information 214 of the next younger instruction 212 was applied to the RMT 204, the effect of the register mapping information 214 of the next younger instruction 212 on the RMT 204 will need to be reversed. Thus, after the younger RMT snapshot 226 is copied into the RMT 204, the RRRC 228 obtains the register mapping information 214 of the next younger instruction 212 from the other ROB entry 222 allocated to the next younger instruction 212 and reverses (undoes) the effect of the register mapping information 214 applied to register mapping state of the RMT 204 by the next younger instruction 212. In this manner, the register mapping state of the RMT 204 corresponding to the target instruction 216 is restored.

In a seventh situation, which is variation to either of the above fifth or sixth situations under the second example, the register mapping information 214 of the target instruction 216 is to be flushed. Thus, after the younger RMT snapshot 226 is copied into the RMT 204, the RRRC 228 will obtain the register mapping information 214 of the target instruction 216 from the target ROB entry 220 and modify the register mapping information 214 in the register mapping state of the RMT 204 accordingly. Modifying the register mapping information 214 in the register mapping state of the RMT 204 based on the register mapping information 214 from the target ROB entry 220 or from one of the other ROB entries 222 after copying the contents of a younger RMT snapshot 226 corresponding to a younger instruction 212 into the RMT 204 is undoing or reversing the register mapping changes due to the younger instruction 212.

In an eighth situation under the second example, the younger RMT snapshot 226 corresponding to the next younger uncommitted instruction 212 was not captured by the snapshot circuit 224. In this situation, the nearest younger RMT snapshot 226 corresponds to another instruction 212 allocated to the snapshot ROB entry 227 that is not next to the target ROB entry 220. In this situation, the snapshot ROB entry 227 may be separated from the target ROB entry 220 by a number of other ROB entries 222. Here, the RRRC 228 first copies the contents of the RMT snapshot 226 corresponding to the younger instruction 212 into the RMT 204. Next, if the second situation above applies (i.e., the younger RMT snapshot 226 was captured after the register mapping information 214 of the older instruction 212 was applied to the RMT 204), the RRRC 228 obtains the register mapping information 214 from the snapshot ROB entry 227 and modifies (reverses the effect of the register mapping information 214 on) the RMT 204. Then, for each of the other ROB entries 222 between the snapshot ROB entry 227 and the target ROB entry 220, the RRRC 228 obtains the register mapping information 214 from the other ROB entries 222 and modifies the RMT 204 based on the register mapping information 214 from the other ROB entries 222 in sequence from the snapshot ROB entry 227 to the target ROB entry 220. As in the seventh situation under the second example above, if the target instruction 216 is to be flushed, the register mapping information 214 of the target instruction 216 may also be obtained from the target ROB entry 220 and reversed in the RMT 204 to restore the register mapping state of the RMT 204 to a state corresponding to the target instruction 216.

In the second example, in which the RRRC 228 employs the younger RMT snapshot 226, the snapshot ROB entry 227 is closer to the target ROB entry 220 than the current tail entry 232 of the ROB 208, which is allocated to the youngest uncommitted instruction 212. Therefore, walking the other ROB entries 222 back from the RMT snapshot 226 associated with the snapshot ROB entry 227 requires walking fewer other ROB entries 222 than walking the other ROB entries 222 back from the tail entry 232 if there was no younger RMT snapshot 226.

In a third example, rather than statically employing an older RMT snapshot 226 or statically employing a younger RMT snapshot 226, the RRRC 228 determines a first number of the other ROB entries 222 between the target ROB entry 220 and the older snapshot ROB entry 227 (the snapshot ROB entry 227 between the head entry 230 and the target ROB entry 220), and determines a second number of the other ROB entries 222 between the target ROB entry 220 and the younger snapshot ROB entry 227 (the snapshot ROB entry 227 between the tail entry 232 and the target ROB entry 220). Next, the RRRC 228 determines that the first number is less than the second number, which means that fewer of the other ROB entries 222 would need to be walked to restore the register mapping state of the RMT 204 by walking the older other ROB entries 222 than to restore the register mapping state of the RMT 204 by walking the younger other ROB entries 222. To reduce time for register mapping state recovery of the RMT 204, the RRRC 228 can dynamically choose to walk the shorter path with the fewer number of other ROB entries 222 as discussed above.

The illustrations of the ROB 208, the mapping control circuit 210, the RMT 204, and the CMT 206 are merely examples for the purpose of explaining the circuits and processes disclosed herein and are not intended to limit the present disclosure. For example, the number of ROB entries 222 in the ROB 208 may be more or less than those shown and may include more or other information than what is illustrated and disclosed herein. The RMT 204 and CMT 206 may also include a different number of entries and different data than those shown in FIG. 2 and the present disclosure is not limited in this regard.

Figure 3:
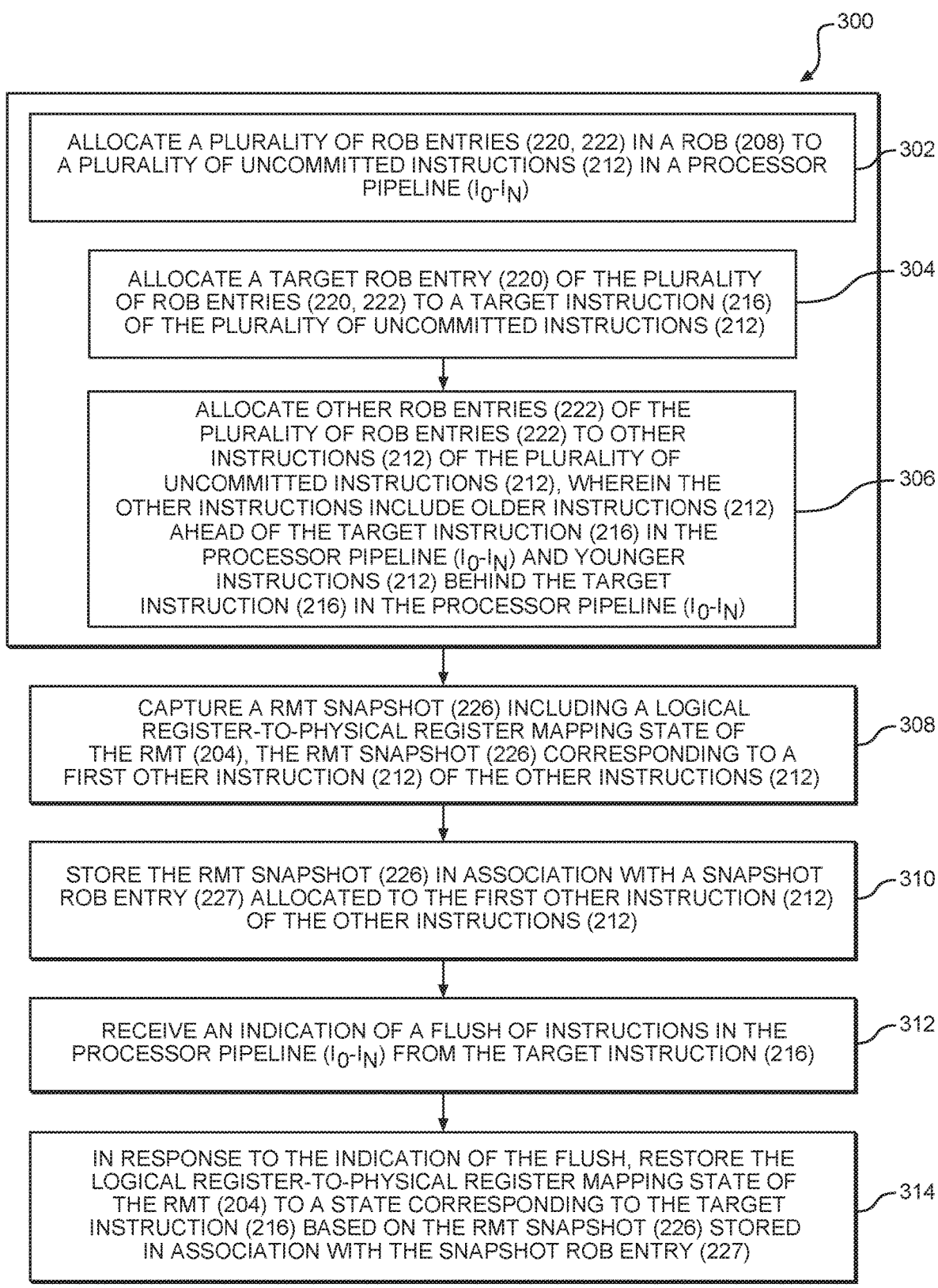
FIG. 3 is a flowchart illustrating an exemplary process of the register mapping circuit of FIG. 2 for restoring a register mapping state of a rename map table, in response to an indication of a target instruction, based on a snapshot of the rename map table capturing the register mapping state for another instruction.

FIG. 3 is an illustration of a flowchart of an exemplary process 300 of the register mapping circuit 200 in FIG. 2 for register mapping state recovery of the RMT 204 to a state corresponding to the target ROB entry 220, employing a RMT snapshot 226 corresponding to another instruction 212. The process 300 includes allocating a plurality of ROB entries 220, 222 in a ROB 208 to a plurality of uncommitted instructions 212 in a processor pipeline $I_0$-$I_N$ (block 302), including allocating a target ROB entry 220 of the plurality of ROB entries 220, 222 to a target instruction 216 of the plurality of uncommitted instructions 212 (block 304) and allocating other ROB entries 222 of the plurality of ROB entries 222 to other instructions 212 of the plurality of uncommitted instructions 212, wherein the other instructions include older instructions 212 ahead of the target instruction 216 in the processor pipeline $I_0$-$I_N$ and younger instructions 212 behind the target instruction 216 in the processor pipeline $I_0$-$I_N$ (block 306). The process 300 further includes capturing a RMT snapshot 226 including a logical register-to-physical register mapping state of the RMT 204, the RMT snapshot 226 corresponding to a first other instruction 212 of the other instructions 212 (block 308). The process 300 includes storing the RMT snapshot 226 in association with a snapshot ROB entry 227 allocated to the first other instruction 212 of the other instructions 212 (block 310). The process 300 also includes receiving an indication of a flush of instructions in the processor pipeline $I_0$-$I_N$ from the target instruction 216 (block 312). The process 300 still further includes, in response to the indication of the flush, restoring the logical register-to-physical register mapping state of the RMT 204 to a state corresponding to the target instruction 216 based on the RMT snapshot 226 stored in association with the snapshot ROB entry 227 (block 314).

The process 300 of the register mapping circuit 200 restores the register mapping state of the RMT 204 to the state corresponding to the target instruction 216 based on RMT snapshots 226 corresponding to other instructions 212 and walking the other ROB entries 222, if any, between the snapshot ROB entry 227 associated with the RMT snapshot 226 and the target ROB entry 220. A determination of the other instructions 212 for which a corresponding RMT snapshot 226 is captured may be customized according to various factors such as test results, statistical analysis, program types, historical results, worst-case snapshot resources needed, etc. For example, the RMT snapshot 226 may be captured as every Nth instruction (where N is an integer) enters the instruction pipeline $I_0$-$I_N$, which would result in the RMT snapshots 226 being stored in association with every Nth ROB entry 222. Alternatively, the RMT snapshot 226 may be captured at every Nth branch instruction. In another example, the RMT snapshots 226 may be captured to correspond to only instructions 212 that have a higher probability of being mispredicted, based on a probability threshold determined by heuristic methods, for example. For example, a history of which conditional instructions were more likely to be mispredicted may be stored and used to generate a probability threshold. Other methods of determining when to capture RMT snapshots 226 are also possible.

Figure 4:
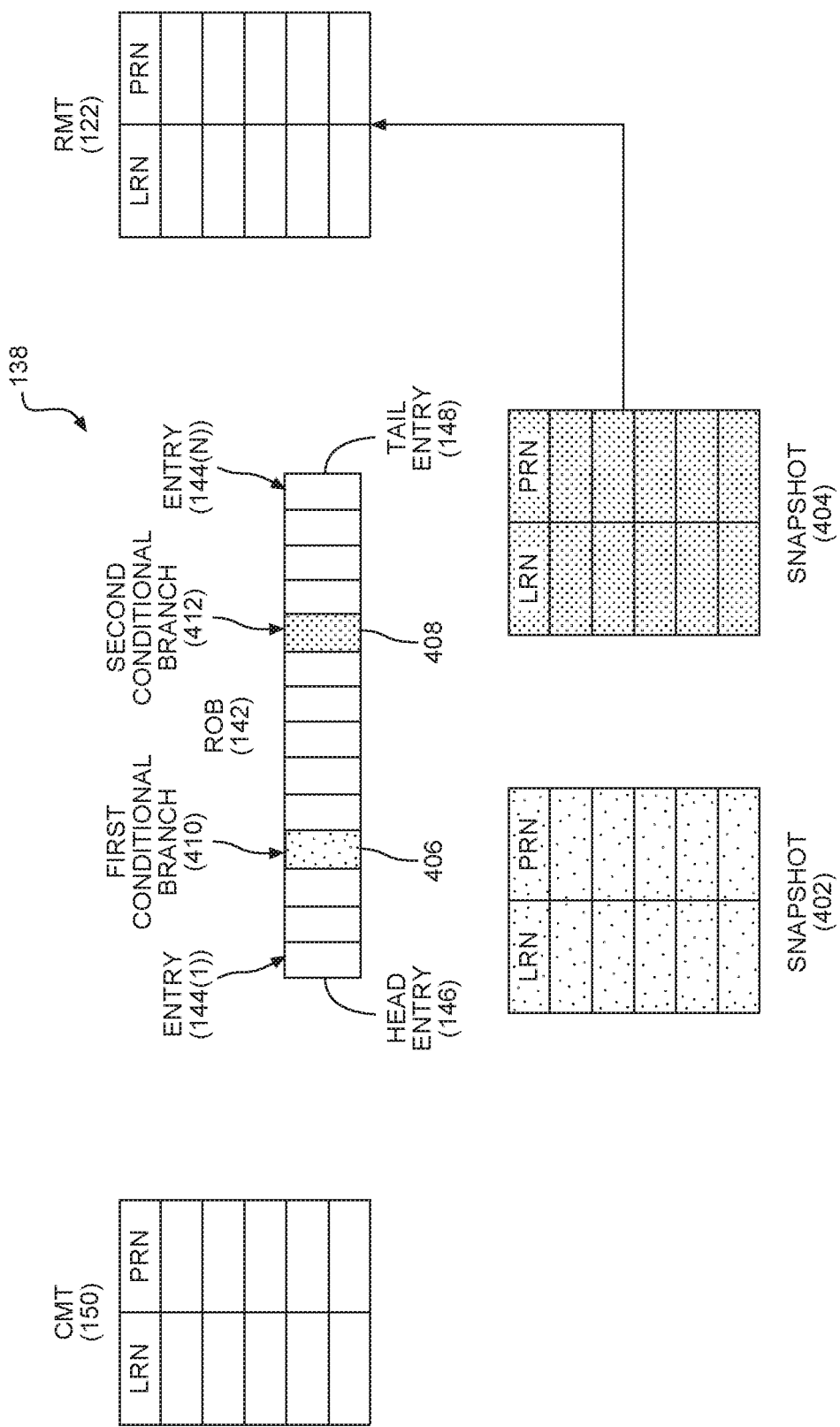
FIG. 4 is a schematic diagram including components of the instruction processing circuit in FIG. 1 provided for describing a snapshot-based method of recovering a previous state of the rename map table corresponding to when a target instruction, which is to be flushed, entered the processor.

The above methods of determining the circumstances under which a RMT snapshot 226 is captured are different from a previously known snapshot-based method, which is described with reference to FIG. 4. FIG. 4 is another illustration of the register mapping circuit 138 in FIG. 1 including only the RMT 122, the ROB 142, and the CMT 150. The ROB 142 includes the head entry 146 and the tail entry 148. FIG. 4 also includes illustrations of RMT snapshots 402 and 404, which are copies of the RMT 122. The RMT snapshots 402 and 404 are associated with ROB entries 406 and 408, respectively. That is, the RMT snapshot 402 is a copy of the register mapping state of the RMT 122 associated with a snapshot ROB entry 406, and the RMT snapshot 404 is a copy of the register mapping state of the RMT 122 associated with a snapshot ROB entry 408. The snapshot ROB entry 406 is allocated to a first conditional branch instruction 410 and the snapshot ROB entry 408 is allocated to a second conditional branch instruction 412. According to the method implemented as illustrated in FIG. 4, RMT snapshots are only captured in correspondence with instructions that may result in a flush (e.g., due to misprediction) and are captured to correspond to every instruction that may result in a flush. The RMT snapshots 406 and 408 being the only snapshots associated with any entries 144 (1)-144(N) in the ROB 142 indicates that the first and second conditional branch instructions 410 and 412 are the only instructions in the instruction pipelines $I_0$-$I_N$ that could result in a flush. Therefore, in this method, there is a RMT snapshot 406, 408 corresponding to every instruction that may result in a flush, and the corresponding RMT snapshot 406, 408 can be copied into the RMT 122 to immediately restore the register mapping state of the RMT 122 to a state corresponding to the instructions 410 or 412. No register mapping information is needed from the ROB entries 144 (1)-144(N) because the ROB entries are not "walked" in this method. However, the snapshot-based method of FIG. 4 can require many snapshot resources for storing snapshots in a worst-case scenario. For example, the actual number of ROB entries 144(1)-144(N) may be significantly greater than the number of ROB entries 144(1)-144(N) illustrated in FIG. 4. If every ROB entry 144(1)-144(N) is allocated to a conditional branch instruction that could result in a flush, a RMT snapshot must be stored for every one of the many ROB entries 144(1)-144(N), requiring significant additional snapshot resources in the instruction processing circuit 100. If there are insufficient snapshot resources, the instruction pipeline may be stalled until a snapshot resource becomes available, causing delays in the instruction processing circuit 100.

Figure 5:
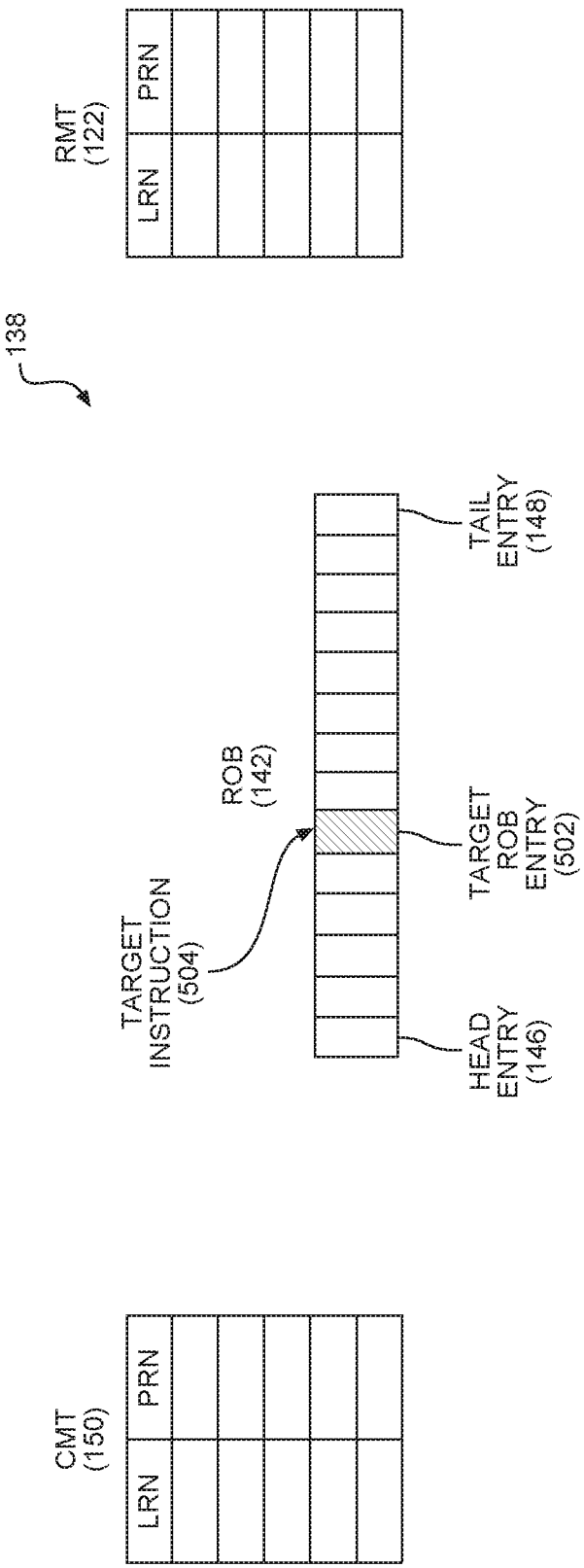
FIG. 5 is a schematic diagram including components of the instruction processing circuit in FIG. 1 provided for describing a method of walking reorder buffer (ROB) entries to recover a previous state of the rename map table corresponding to when a target instruction, which is to be flushed, entered the processor.

Another previously known method, requiring no snapshot resources, is described with reference to FIG. 5. FIG. 5 is another illustration of the register mapping circuit 138 in FIG. 1 including only the RMT 122, the ROB 142, and the CMT 150. Rather than capturing RMT snapshots, which can be copied into the RMT 122, the use of snapshot resources is entirely avoided by a method of walking the ROB entries 144(1)-144(N). For example, a target ROB entry 502 in the ROB 142 is allocated to a target instruction 504 (e.g., a conditional branch instruction) that may result in a flush. In this case, since there are no RMT snapshots available, the only known states of the RMT 122 are the current state of the RMT 122 and the state of the CMT 150 as of the last committed instruction.

The register mapping circuit 138 can determine to "walk" the ROB entries 144(1)-144(N) between the target ROB entry 502 and the head entry 146 by obtaining register mapping information for each of the instructions for which the ROB entries 144(1)-144(N) are allocated and redoing or undoing (depending on walking direction) the effect of such register mapping information sequentially. For example, the CMT 150 can be copied into the RMT 122 and the instructions can be walked back from the head entry 146 to the target ROB entry 502, as discussed above. Alternatively, all the register mapping information in the RMT 122 that has been changed since the target instruction 504 can be identified and restored by walking the ROB entries 144(1)-144(N) sequentially back from the target ROB entry 502 to the head entry 146 and completing the restoration with register mapping information from the CMT 150.

The register mapping circuit 138 in FIG. 5 can also determine to walk the ROB entries between the target ROB entry 502 and the tail entry 148. Specifically, the ROB entries 142 can be walked from the target ROB entry 502 to the tail entry 148 or walked back from the tail entry 148 to the target ROB entry 502. As another alternative, the register mapping circuit 138 can choose a direction to walk (i.e., to/from head entry 146 or to/from tail entry 148) depending where the target ROB entry 502 is located at the time of the flush and which direction would allow for faster recovery of the register mapping state of the RMT 122.

Figure 6:
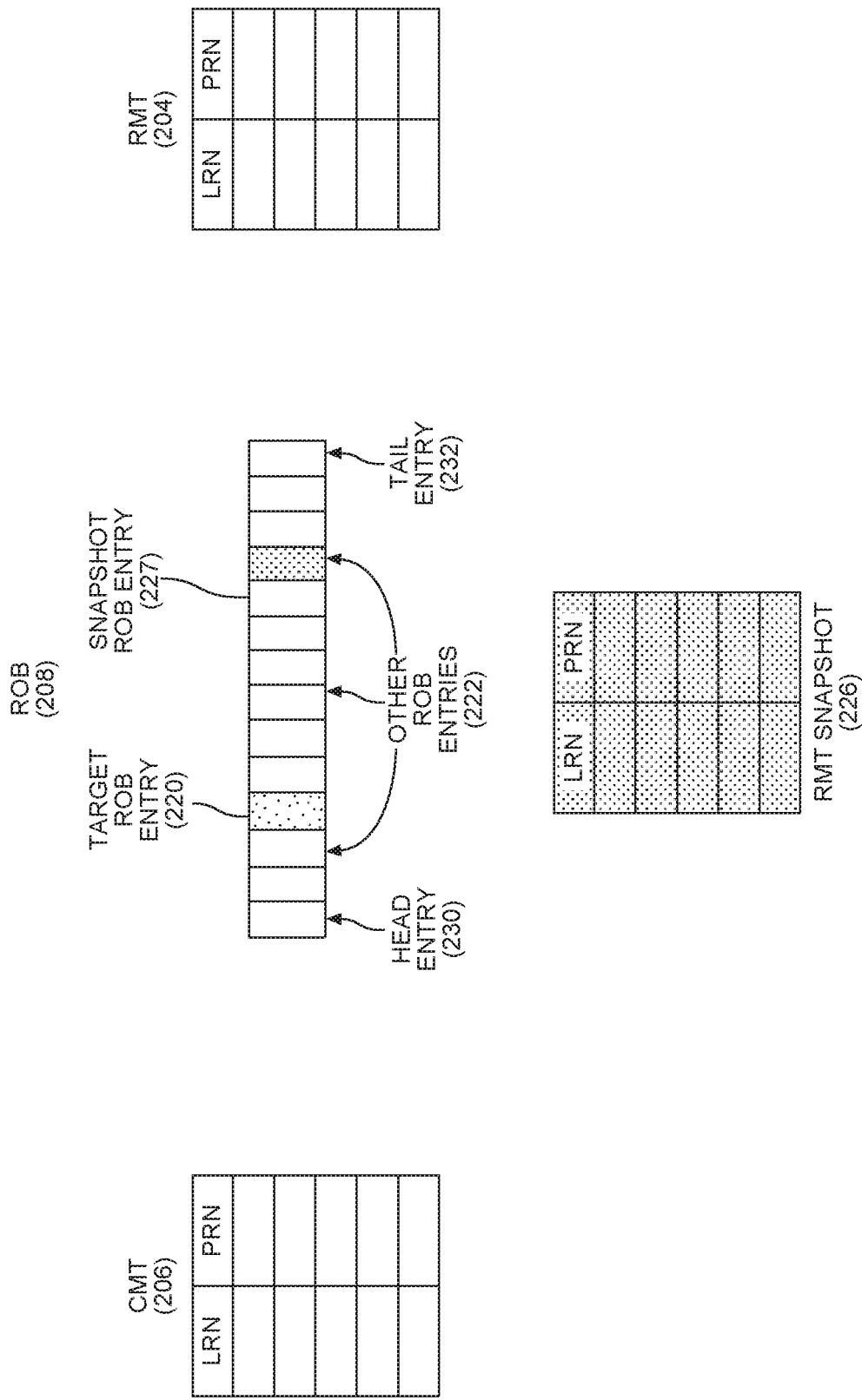
FIG. 6 is a schematic diagram including components of the exemplary register mapping circuit in FIG. 2 for explaining restoring a register mapping state of a rename map table, in response to an indication of a target instruction, comparing the previously known methods in FIGS. 5 and 6 to a snapshot of the rename map table corresponding to another instruction.

FIG. 6 is an illustration of the RMT 204, CMT 206, and ROB 208 of FIG. 2 for reference in a further discussion of the exemplary register mapping circuit 200 in FIG. 2. As will be explained, the register mapping circuit 200 in FIG. 2 may operate according to the previously known methods discussed above with regard to FIGS. 4 and 5 under certain circumstances.

In FIG. 6, if the snapshot circuit 224 happens to capture a RMT snapshot 226 associated with the target ROB entry 220 (allocated to the target instruction 216), the register mapping state of the RMT 204 could be restored to a state corresponding to the target instruction 216 by simply copying the RMT snapshot 226 to the RMT 204 in a manner similar to the snapshot-based method described in reference to FIG. 4. However, that is not typically the case in FIG. 6 because, in the register mapping circuit 200, there is not a RMT snapshot 226 corresponding to every instruction that may result in a flush. Therefore, if no RMT snapshot 226 is captured corresponding to the target instruction 216, the register mapping state of the RMT 204 will need to be restored based on a known state of the RMT 204, such as the RMT snapshot 226 associated with the younger other ROB entry 222 or the CMT 206. There are two (2) older other ROB entries 222 between the target ROB entry 220 allocated to the target instruction 216 and the head entry 230 allocated to the oldest uncommitted instruction 212 in the ROB 208. There are five (5) younger other ROB entries 222 of the ROB 208 between the target ROB entry 220 and the snapshot ROB entry 227 of the other ROB entries 222 associated with a RMT snapshot 226. Thus, restoring the register mapping state of the RMT 204 based on the CMT 206 would only require copying the CMT 206 into the RMT 204 and walking the head entry 230 and the two older other ROB entries 222. Whereas, restoring the register mapping state of the RMT 204 based on the RMT snapshot 226 would require walking the five (5) younger other ROB entries 222. If the RMT 204 could be restored faster based on the CMT 206 and walking two older other ROB entries 222, than on the RMT snapshot 226 and walking five younger other ROB entries 222, the register mapping circuit 200 may choose to restore the RMT 204 based on the CMT 206, in a manner similar to the method described with respect to FIG. 5.

Figure 7:
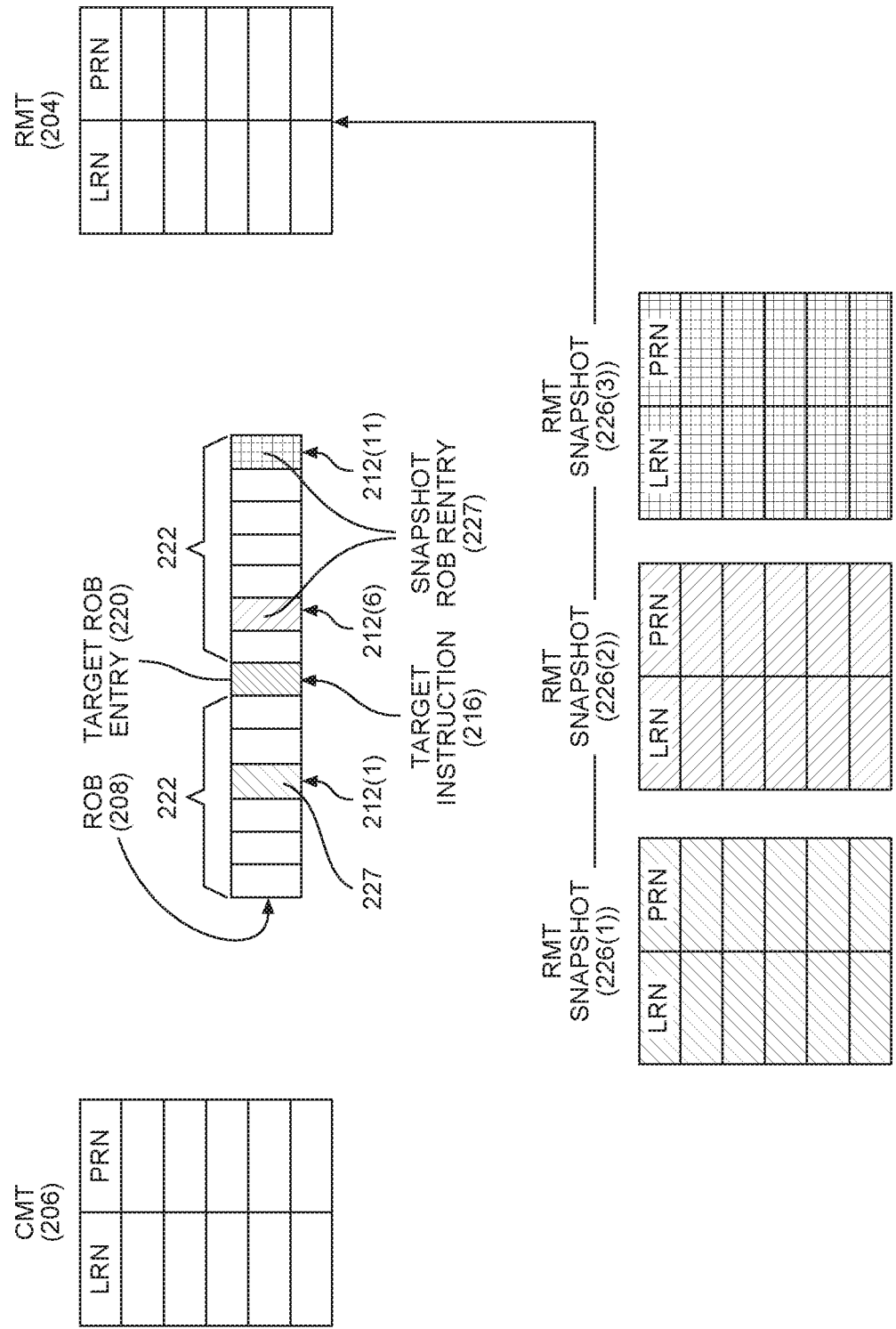
FIG. 7 is a schematic diagram including components of the exemplary register mapping circuit in FIG. 2 for explaining additional examples of restoring a register mapping state of a rename map table, in response to an indication of a target instruction, based on a snapshot of the rename map table corresponding to another instruction.

FIG. 7 is another illustration of the register mapping circuit 200 of FIG. 2 including the RMT 204, the CMT 206, and the ROB 208. Here, the RRRC 228, the ROB control circuit 218, and the snapshot circuit 224 of the mapping control circuit 210 are not shown. The snapshot circuit 224 captures one of the RMT snapshots 226(1)-226(3) at every Nth instruction 212, where N=5. RMT snapshot 226(1) corresponds to instruction 212(1), RMT snapshot 226(2) corresponds to instruction 212(6), and RMT snapshot 226(3) corresponds to instruction 212(11). Thus, every fifth one of the other ROB entries 222 is allocated to one of the other instructions 212. The target ROB entry 220 is allocated to the target instruction 216, which is a conditional branch instruction for which the condition has been mispredicted and a flush is indicated. Additional examples of operation of the register mapping circuit 200 based on the above scenario are described with reference to FIG. 7.

In a first example of register mapping state recovery of the RMT 204 to a state corresponding to the target ROB entry 220, employing a RMT snapshot 226 corresponding to another instruction 212, the RRRC 228 employs an older RMT snapshot 226 in a snapshot ROB entry 227. In this example, the register mapping state of the RMT 204 is restored based on the RMT snapshot 226(1) corresponding to the other instruction 212(1).

In a second example, the RRRC 228 employs a younger RMT snapshot 226. Here, there is currently a younger RMT snapshot 226(2) and a younger RMT snapshot 226(3). The RRRC 228 can determine a first number of other ROB entries 222 between the snapshot ROB entry 227 associated with the RMT snapshot 226(2), and a second number of other ROB entries 222 between the snapshot ROB entry 227 associated with the RMT snapshot 226(3). In this case, the register mapping state of the RMT 204 may be recovered in less time based on the RMT snapshot 226(2) because there would be a smaller number of the other ROB entries 222 to walk.

In a third example, the RRRC 228 may determine the closest snapshot ROB entry 227 associated with a RMT snapshot 226 in either direction (i.e., for which a few number of other ROB entries 222 would be walked), and choose the option with the shorter number. In FIG. 7, the RMT snapshot 226(2) is associated with the closest snapshot ROB entry 227, and would be selected to complete the recovery in a shortest time.

Figure 8:
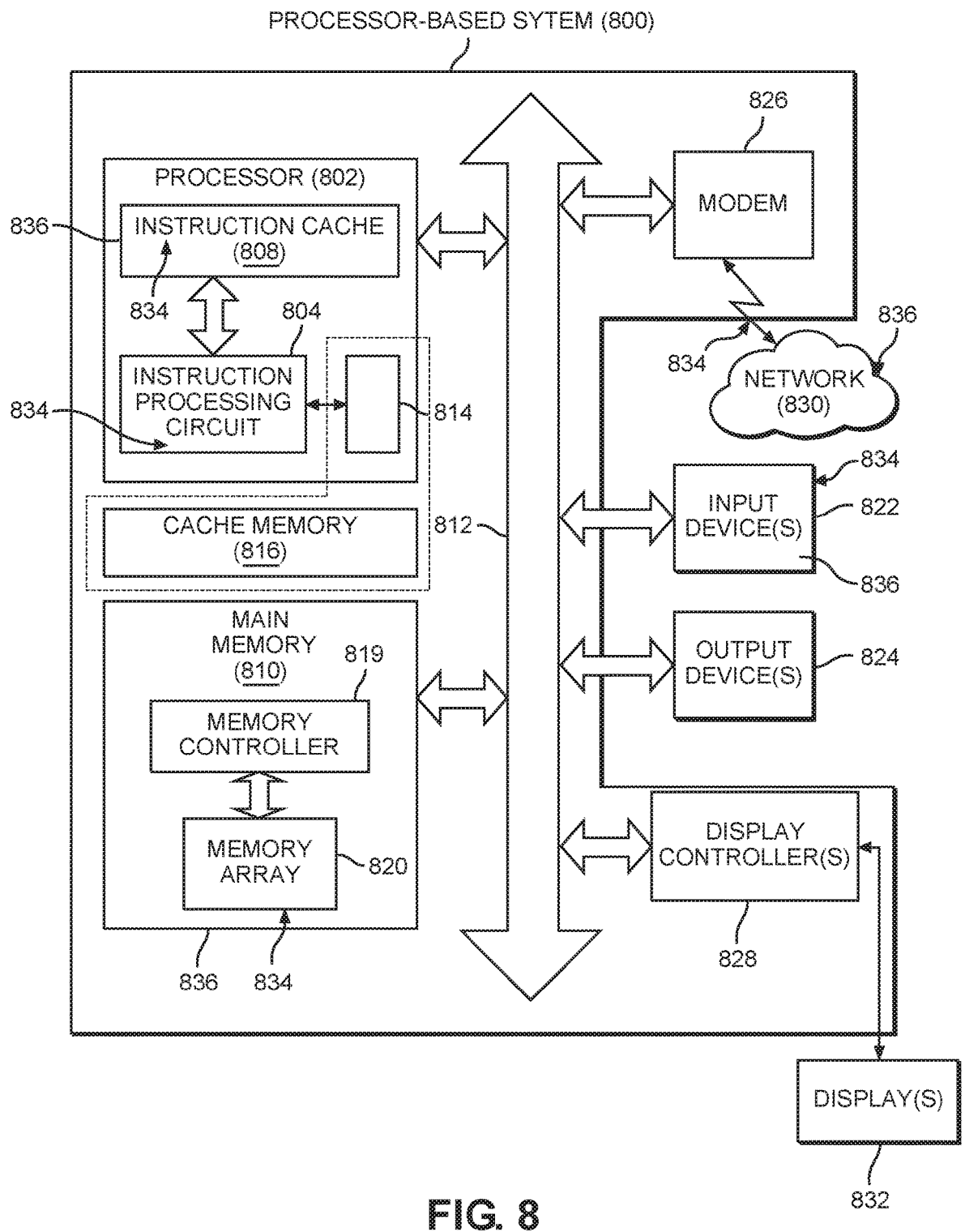
FIG. 8 is a block diagram of an exemplary processor-based system including a processor including the register mapping circuit in FIG. 2 configured to restore a register mapping state of a rename map table in response to an indication of a target instruction based on a snapshot of the rename map table corresponding to another instruction.

FIG. 8 is a block diagram of an exemplary processor-based system 800 that includes a processor 802 (e.g., a microprocessor) that includes an instruction processing circuit 804. The processor-based system 800 can be the instruction processing circuit 100 in FIG. 1 as an example. The instruction processing circuit 804 can be the instruction processing circuit 202 in FIG. 2 as an example. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 808 for temporary, fast access memory storage of instructions accessible by the instruction processing circuit 804. Fetched or prefetched instructions from a memory, such as from a main memory 810 over a system bus 812, are stored in the instruction cache 808. The instruction processing circuit 804 is configured to process instructions fetched into the instruction cache 808 and process the instructions for execution.

The processor 802 can include a RRRC 814 to recover a state of a RMT in the instruction processing circuit 804 in response to a flush indication indicating a flush of some instruction in an instruction pipeline due to a failed instruction. The processor 802 may be the processor 104 in FIG. 1, which may be configured to minimize traversal of the reorder buffer in the RMT recovery. The processor-based system 800 can also include a cache memory 816 to temporarily store data from the main memory 810 for fast access by the processor 802.

The processor 802 and the main memory 810 are coupled to the system bus 812 and can intercouple peripheral devices included in the processor-based system 800. As is well known, the processor 802 communicates with these other devices by exchanging address, control, and data information over the system bus 812. For example, the processor 802 can communicate bus transaction requests to a memory controller 819 in the main memory 810 as an example of a slave device. Although not illustrated in FIG. 8, multiple system buses 812 could be provided, wherein each system bus constitutes a different fabric. In this example, the memory controller 819 is configured to provide memory access requests to a memory array 820 in the main memory 810. The memory array 820 is comprised of an array of storage bit cells for storing data. The main memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the main memory 810, one or more input devices 822, one or more output devices 824, a modem 826, and one or more display controllers 828, as examples. The input device(s) 822 can include any type of input device, including, but not limited to, input keys, switches, voice processors, etc. The output device(s) 824 can include any type of output device, including, but not limited to, audio, video, other visual indicators, etc. The modem 826 can be any device configured to allow exchange of data to and from a network 830. The network 830 can be any type of network, including, but not limited to, a wired or wireless network, a private or public network, a local area network (LAN), a wireless local area network (WLAN), a wide area network (WAN), a BLUETOOTH™ network, and the Internet. The modem 826 can be configured to support any type of communications protocol desired. The processor 802 may also be configured to access the display controller(s) 828 over the system bus 812 to control information sent to one or more displays 832. The display(s) 832 can include any type of display, including, but not limited to, a cathode ray tube (CRT), a liquid crystal display (LCD), a plasma display, etc.

The processor-based system 800 in FIG. 8 may include a set of instructions 834 to be executed by the processor 802 for any application desired according to the instructions. The instructions 834 may be stored in the main memory 810, processor 802, and/or instruction cache 808 as examples of a non-transitory computer-readable medium 836. The instructions 834 may also reside, completely or at least partially, within the main memory 810 and/or within the processor 802 during their execution. The instructions 834 may further be transmitted or received over the network 830 via the modem 826, such that the network 830 includes computer-readable medium 836.

While the computer-readable medium 836 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A register mapping circuit in a processor, the register mapping circuit comprising:
    a reorder buffer (ROB) control circuit configured to allocate a plurality of ROB entries in a ROB to a plurality of uncommitted instructions in a processor pipeline, wherein:
        the plurality of uncommitted instructions comprises a target instruction and other instructions;
        the plurality of ROB entries comprises a target ROB entry allocated to the target instruction and other ROB entries allocated to the other instructions; and
        the other instructions comprise older instructions ahead of the target instruction in the processor pipeline and younger instructions behind the target instruction in the processor pipeline;
    a snapshot circuit configured to:
        capture a rename map table snapshot comprising a logical register-to-physical register mapping state of a rename map table, the rename map table snapshot corresponding to a first other instruction of the other instructions; and
        store the rename map table snapshot in association with a snapshot ROB entry allocated to the first other instruction of the other instructions; and
    a register rename recovery circuit, configured to:
        receive an indication of a flush of instructions in the processor pipeline from the target instruction; and
        in response to the indication of the flush, restore the logical register-to-physical register mapping state of the rename map table to a state corresponding to the target instruction based on the rename map table snapshot stored in association with the snapshot ROB entry.

2. The register mapping circuit of claim 1, wherein the register rename recovery circuit is further configured to restore the logical register-to-physical register mapping state of the rename map table based on register mapping information in at least one of:

the snapshot ROB entry;
one or more of the other ROB entries between the snapshot ROB entry and the target ROB entry; and
the target ROB entry.

3. The register mapping circuit of claim 1, wherein:
the rename map table snapshot is a first rename map table snapshot;
the snapshot circuit is further configured to:
  capture a second rename map table snapshot corresponding to a second other instruction of the other instructions; and
  store the second rename map table snapshot in association with a second ROB entry of the other ROB entries allocated to the second other instruction; and
a first number of the other ROB entries between the target ROB entry and the snapshot ROB entry is less than a second number of the other ROB entries between the target ROB entry and the second ROB entry.

4. The register mapping circuit of claim 3, wherein the first other instruction and the second other instruction each comprise an older instruction.

5. The register mapping circuit of claim 3, wherein the first other instruction and the second other instruction each comprise a younger instruction.

6. The register mapping circuit of claim 3, wherein:
a first one of the first other instruction and the second other instruction comprises an older instruction; and
a second one of the first other instruction and the second other instruction comprises a younger instruction.

7. The register mapping circuit of claim 1, wherein:
the first other instruction comprises an older instruction,
no rename map table snapshot is stored in association with any of the other ROB entries allocated to a younger instruction; and
a first number of the other ROB entries between the target ROB entry and the snapshot ROB entry is less than a second number of the other ROB entries from the target ROB entry to a tail ROB entry of the other ROB entries allocated to a youngest instruction of the younger instructions.

8. The register mapping circuit of claim 1, wherein:
the first other instruction comprises a younger instruction;
no rename map table snapshot is stored in association with any of the other ROB entries allocated to an older instruction; and
a first number of the other ROB entries between the target ROB entry and the snapshot ROB entry is less than a second number of the other ROB entries from the target ROB entry to a head ROB entry of the other ROB entries allocated to an oldest instruction of the older instructions.

9. The register mapping circuit of claim 1, wherein:
the first other instruction comprises an older instruction; and
to restore the logical register-to-physical register mapping state of the rename map table to the state corresponding to the target instruction, the register rename recovery circuit is further configured to:
  copy the logical register-to-physical register mapping state in the rename map table snapshot to the rename map table;
  modify register mapping information of the logical register-to-physical register mapping state of the rename map table based on register mapping information in the target ROB entry; and
  modify the register mapping information of the logical register-to-physical register mapping state of the rename map table based on register mapping information in the other ROB entries from the snapshot ROB entry to the target ROB entry in sequence.

10. The register mapping circuit of claim 1, wherein:
the first other instruction comprises an older instruction; and
to restore the logical register-to-physical register mapping state of the rename map table to the state corresponding to the target instruction, the register rename recovery circuit is further configured to:
  identify register mapping information of the logical register-to-physical register mapping state of the rename map table that was updated by the target instruction or the younger instructions, the identified register mapping information comprising first register mapping information and second register mapping information;
  modify the first register mapping information of the identified register mapping information based on register mapping information in the other ROB entries from the snapshot ROB entry to the target ROB entry in sequence;
  modify the first register mapping information of the identified register mapping information based on register mapping information in the target ROB entry; and
  modify the second register mapping information of the identified register mapping information based on the rename map table snapshot.

11. The register mapping circuit of claim 1, wherein:
the first other instruction comprises a younger instruction; and
to restore the logical register-to-physical register mapping state in the rename map table to the state corresponding to the target instruction, the register rename recovery circuit is further configured to:
  copy the logical register-to-physical register mapping state from the rename map table snapshot to the rename map table; and
  modify the logical register-to-physical register mapping state in the register mapping table based on register mapping information in the other ROB entries from the snapshot ROB entry to the target ROB in sequence.

12. The register mapping circuit of claim 1, wherein:
the first other instruction comprises a younger instruction; and
to restore the logical register-to-physical register mapping state of the rename map table to the state corresponding to the target instruction, the register mapping state recovery circuit is further configured to:
  identify register mapping information of the logical register-to-physical register mapping state in the rename map table that was updated by the target instruction or the younger instructions, the identified register mapping information comprising first register mapping information and second register mapping information;
  modify the first register mapping information of the identified register mapping information based on register mapping information in the other ROB entries from the snapshot ROB entry to the target ROB entry in sequence; and
  modify the second register mapping information of the identified register mapping information based on the rename map table snapshot.

13. The register mapping circuit of claim 1, wherein none of the other ROB entries is between the target ROB entry and the snapshot ROB entry.

14. The register mapping circuit of claim 1, wherein the snapshot circuit configured to capture the rename map table snapshot is further configured to capture a rename map table snapshot corresponding to a conditional instruction having a probability of misprediction above a threshold.

15. The register mapping circuit of claim 1, wherein the snapshot circuit configured to capture the rename map table snapshot is further configured to capture a rename map table snapshot corresponding to every Nth conditional instruction identified as having a probability of misprediction above a threshold.

16. The register mapping circuit of claim 1, wherein the snapshot circuit configured to capture the rename map table snapshot is further configured to capture a rename map table snapshot corresponding to instructions allocated to every Nth ROB entry in the ROB.

17. The register mapping circuit of claim 1, configured to track locations of the other ROB entries in association with the rename map table snapshot.

18. The register mapping circuit of claim 1, configured to update an indicator indicating the rename map table snapshot is associated with the snapshot ROB entry allocated to the first other instruction.

19. The register mapping circuit of claim 1, further configured to update an indicator indicating a second rename map table snapshot is associated with a second ROB entry allocated to a second other instruction.

20. A register mapping circuit, comprising:
a reorder buffer (ROB) control circuit configured to allocate a ROB entry of a plurality of ROB entries in a ROB to each of a plurality of uncommitted instructions in a processor pipeline, wherein:
the plurality of uncommitted instructions comprises a target instruction and other instructions;
the plurality of ROB entries comprises a target ROB entry allocated to the target instruction and other ROB entries allocated to the other instructions; and
the other instructions comprise older instructions ahead of the target instruction in the processor pipeline and younger instructions behind the target instruction in the processor pipeline;
a snapshot circuit configured to:
capture at least one rename map table snapshot each comprising a logical register-to-physical register mapping state of a rename map table, each rename map table snapshot corresponding to a respective one of the other instructions; and
store the at least one rename map table snapshot in association with one of the other ROB entries allocated to the respective one of the other instructions; and
a register rename recovery circuit, configured to:
receive an indication of a flush of instructions in the processor pipeline from the target instruction; and
in response to the indication of the flush, determine a first number of the other ROB entries between the target ROB entry and a closest one of the other ROB entries associated with a rename map table snapshot is greater than a second number of the other ROB entries from the target ROB entry to an end ROB entry, the end ROB entry comprising one of a head ROB entry allocated to an oldest instruction of the older instructions and a tail ROB entry allocated to a youngest instruction of the younger instructions;
in response to the end ROB entry comprising the head ROB entry, restore the logical register-to-physical register mapping state of the rename map table based on a committed map table (CMT) and register mapping information in the other ROB entries from the head ROB entry to the target ROB entry, and
in response to the end ROB entry comprising the tail ROB entry, restore the logical register-to-physical register mapping state of the rename map table based on the rename map table and register mapping information in the other ROB entries from the tail ROB entry to the target ROB entry.

21. A method of a register mapping circuit in a processor, the method comprising:
allocating a plurality of reorder buffer (ROB) entries in a ROB to a plurality of uncommitted instructions in a processor pipeline, comprising:
allocating a target ROB entry of the plurality of ROB entries to a target instruction of the plurality of uncommitted instructions; and
allocating other ROB entries of the plurality of ROB entries to other instructions of the plurality of uncommitted instructions,
wherein the other instructions comprise older instructions ahead of the target instruction in the processor pipeline and younger instructions behind the target instruction in the processor pipeline;
capturing a rename map table snapshot comprising a logical register-to-physical register mapping state of a rename map table, the rename map table snapshot corresponding to a first other instruction of the other instructions;
storing the rename map table snapshot in association with a snapshot ROB entry allocated to the first other instruction of the other instructions;
receiving an indication of a flush of instructions in the processor pipeline from the target instruction; and
in response to the indication of the flush, restoring the logical register-to-physical register mapping state of the rename map table to a state corresponding to the target instruction based on the rename map table snapshot stored in association with the snapshot ROB entry.

22. The method of claim 21, further comprising restoring the logical register-to-physical register mapping state of the rename map table based on register mapping information in at least one of:
the snapshot ROB entry;
one or more of the other ROB entries between the snapshot ROB entry and the target ROB entry; and
the target ROB entry.

23. The method of claim 21, further comprising:
capturing a second rename map table snapshot corresponding to a second other instruction of the other instructions; and
storing the second rename map table snapshot in association with a second ROB entry of the other ROB entries allocated to the second other instruction,
wherein a first number of the other ROB entries between the target ROB entry and the snapshot ROB entry is less than a second number of the other ROB entries between the target ROB entry and the second ROB entry.

24. The method of claim 23, wherein the first other instruction and the second other instruction each comprise an older instruction.

25. The method of claim 23, wherein the first other instruction and the second other instruction each comprise a younger instruction.

26. The method of claim 23, wherein:
a first one of the first other instruction and the second other instruction comprises an older instruction; and
a second one of the first other instruction and the second other instruction comprises a younger instruction.

27. The method of claim 21, wherein:
the first other instruction comprises an older instruction;
no rename map table snapshot is stored in association with any of the other ROB entries allocated to a younger instruction; and
a first number of the other ROB entries between the target ROB entry and the snapshot ROB entry is less than a second number of the other ROB entries from the target ROB entry to a tail ROB entry of the other ROB entries allocated to a youngest instruction of the younger instructions.

28. The method of claim 21, wherein:
the first other instruction comprises a younger instruction;
no rename map table snapshot is stored in association with any of the other ROB entries allocated to an older instruction; and
a first number of the other ROB entries between the target ROB entry and the snapshot ROB entry is less than a second number of the other ROB entries from the target ROB entry to a head ROB entry of the other ROB entries allocated to an oldest instruction of the older instructions.

29. The method of claim 21, wherein:
the first other instruction comprises an older instruction; and
restoring the logical register-to-physical register mapping state of the rename map table to the state corresponding to the target instruction further comprises:
copying the logical register-to-physical register mapping state in the rename map table snapshot to the rename map table; and
modifying register mapping information of the logical register-to-physical register mapping state of the rename map table based on register mapping information in the target ROB entry; and
modifying the register mapping information of the logical register-to-physical register mapping state of the rename map table based on register mapping information in the other ROB entries from the snapshot ROB entry to the target ROB entry in sequence.

30. The method of claim 21, wherein:
the first other instruction comprises an older instruction; and
restoring the logical register-to-physical register mapping state of the rename map table to the state corresponding to the target instruction further comprises:
identifying register mapping information of the logical register-to-physical register mapping state of the rename map table that was updated by the target instruction or the younger instructions, the identified register mapping information comprising first register mapping information and second register mapping information;
modifying the first register mapping information of the identified register mapping information based on register mapping information in the other ROB entries from the snapshot ROB entry to the target ROB entry in sequence;
modifying the first register mapping information of the identified register mapping information based on register mapping information in the target ROB entry; and
modifying the second register mapping information of the identified register mapping information based on the rename map table snapshot.

31. The method of claim 21, wherein:
the first other instruction comprises a younger instruction; and
restoring the logical register-to-physical register mapping state in the rename map table to the state corresponding to the target instruction further comprises:
copying the logical register-to-physical register mapping state from the rename map table snapshot to the rename map table; and
modifying the logical register-to-physical register mapping state in the register mapping table based on register mapping information in the other ROB entries from the snapshot ROB entry to the target ROB entry in sequence.

32. The method of claim 21, wherein:
the first other instruction comprises a younger instruction; and
restoring the logical register-to-physical register mapping state of the rename map table to the state corresponding to the target instruction further comprises:
identifying register mapping information of the logical register-to-physical register mapping state in the rename map table that was updated by the target instruction or the younger instructions, the identified register mapping information comprising first register mapping information and second register mapping information;
modifying the first register mapping information of the identified register mapping information based on register mapping information in the other ROB entries from the snapshot ROB entry to the target ROB entry in sequence; and
modifying the second register mapping information of the identified register mapping information based on the rename map table snapshot.

33. The method of claim 21, wherein none of the other ROB entries is between the target ROB entry and the snapshot ROB entry.

34. The method of claim 21, wherein capturing the rename map table snapshot further comprises capturing a rename map table snapshot corresponding to a conditional instruction having a probability of misprediction above a threshold.

35. The method of claim 21, wherein capturing the rename map table snapshot further comprises capturing a rename map table snapshot corresponding to every Nth conditional instruction identified as having a probability of misprediction above a threshold.

36. The method of claim 21, wherein capturing the rename map table snapshot further comprises capturing a rename map table snapshot corresponding to instructions allocated to every Nth ROB entry in the ROB.

37. The method of claim 21, further comprising tracking locations of the other ROB entries in association with the rename map table snapshot.

38. The method of claim 21, further comprising updating an indicator indicating the rename map table snapshot is associated with the snapshot ROB entry allocated to the first other instruction.

39. The method of claim 21, further comprising updating an indicator indicating a second rename map table snapshot is associated with a second ROB entry allocated to a second other instruction.

40. A method performed in a register mapping circuit, comprising:
- allocating a plurality of reorder buffer (ROB) entries in a ROB to a plurality of uncommitted instructions in a processor pipeline, comprising:
  - allocating a target ROB entry of the plurality of ROB entries to a target instruction of the plurality of uncommitted instructions; and
  - allocating other ROB entries of the plurality of ROB entries to other instructions of the plurality of uncommitted instructions,
    - wherein the other instructions comprise older instructions ahead of the target instruction in the processor pipeline and younger instructions behind the target instruction in the processor pipeline;
- capturing at least one rename map table snapshot each comprising a logical register-to-physical register mapping state of a rename map table, each rename map table snapshot corresponding to a respective one of the other instructions;
- storing the at least one rename map table snapshot in association with one of the other ROB entries allocated to the respective one of the other instructions;
- receiving an indication of a flush of instructions in the processor pipeline from the target instruction;
- in response to the indication of the flush, determining a first number of the other ROB entries between the target ROB entry and a closest one of the other ROB entries associated with a rename map table snapshot is greater than a second number of the other ROB entries from the target ROB entry to an end ROB entry, the end ROB entry comprising one of a head ROB entry allocated to an oldest instruction of the older instructions and a tail ROB entry allocated to a youngest instruction of the younger instructions;
- in response to the end ROB entry comprising the head ROB entry, restoring the logical register-to-physical register mapping state of the rename map table based on a committed map table (CMT) and register mapping information in the other ROB entries from the head ROB entry to the target ROB entry; and
- in response to the end ROB entry comprising the tail ROB entry, restoring the logical register-to-physical register mapping state of the rename map table based on the rename map table and register mapping information in the other ROB entries from the tail ROB entry to the target ROB entry.

* * * * *